(12) United States Patent
Shu

(10) Patent No.: US 12,348,864 B2
(45) Date of Patent: Jul. 1, 2025

(54) LIGHT EMITTING APPARATUS, IMAGING SYSTEM, CONTROL METHOD OF LIGHT EMITTING APPARATUS, AND STORAGE MEDIUM

(71) Applicant: CANON KABUSHIKI KAISHA, Tokyo (JP)

(72) Inventor: Takayuki Shu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 18/467,891

(22) Filed: Sep. 15, 2023

(65) Prior Publication Data

US 2024/0137648 A1 Apr. 25, 2024
US 2024/0236484 A9 Jul. 11, 2024

(30) Foreign Application Priority Data

Oct. 20, 2022 (JP) .................................. 2022-168414

(51) Int. Cl.
*H04N 23/663* (2023.01)
*H04N 23/667* (2023.01)
*H04N 23/74* (2023.01)

(52) U.S. Cl.
CPC ......... *H04N 23/663* (2023.01); *H04N 23/667* (2023.01); *H04N 23/74* (2023.01)

(58) Field of Classification Search
None
See application file for complete search history.

(56) References Cited

U.S. PATENT DOCUMENTS

| | | | | |
|---|---|---|---|---|
| 11,490,072 | B2 * | 11/2022 | Horie | G01R 31/2635 |
| 11,611,709 | B2 * | 3/2023 | Sugawara | H04N 23/663 |
| 2005/0265014 | A1 * | 12/2005 | Matsui | H04N 23/56 |
| | | | | 348/E5.029 |
| 2007/0189754 | A1 * | 8/2007 | Iwasaki | H04N 23/74 |
| | | | | 348/E5.029 |
| 2010/0066859 | A1 * | 3/2010 | Ohki | H04N 23/70 |
| | | | | 348/229.1 |
| 2019/0394381 | A1 * | 12/2019 | Gouji | H04N 23/72 |

FOREIGN PATENT DOCUMENTS

JP  4551295 B2  9/2010

* cited by examiner

*Primary Examiner* — Cynthia Segura
(74) *Attorney, Agent, or Firm* — Cowan, Liebowitz & Latman, P.C.

(57) ABSTRACT

A light emitting apparatus includes a processor having a first mode for causing a light emitting unit to emit light with a first light emission amount, and a second mode for causing the light emitting unit to emit the light with a second light emission amount acquired from an image pickup apparatus. In a case where the processor receives a light emitting instruction in the second mode while the light emitting unit is in the first mode, the processor causes the light emitting unit to emit the light in the second mode. In a case where the processor receives an end instruction in the second mode, the processor causes the light emitting unit to emit the light in the second mode and then the light emitting unit to emit the light in the first mode.

10 Claims, 5 Drawing Sheets

LIGHT EMITTING APPARATUS, IMAGING SYSTEM, CONTROL METHOD OF LIGHT EMITTING APPARATUS, AND STORAGE MEDIUM

BACKGROUND

Technical Field

One of the aspects of the embodiments relates to a light emitting apparatus, an imaging system, a control method of the light emitting apparatus, and a storage medium.

Description of Related Art

Some conventional light emitting apparatuses (strobe apparatuses) are attachable to and detachable from image pickup apparatuses and include a light emitting unit (LED) other than a flashlight emitting unit. The LED can be used for a variety of applications such as autofocus (AF) assisting light, video light, or a modeling lamp. For example, the video light is used in a case where the inside of the screen is dark during moving image capturing, and the modeling lamp is turned on before still image capturing to previously check how the light and shadow will be cast by the flashlight emitted during the actual imaging. Japanese Patent No. 4551295 discloses a technology of using an LED built in an image pickup apparatus for flashlight emission and AF auxiliary light during imaging.

Japanese Patent No. 4551295 does not disclose the use of the LED as modeling lamp, or does not consider switching the LED between the modeling lamp and the AF auxiliary light. Thus, the technology disclosed in Japanese Patent No. 4551295 cannot perform proper light emission control according to the application.

SUMMARY

A light emitting apparatus according to one aspect of the embodiment is attachable to and detachable from an image pickup apparatus. The light emitting apparatus includes a light emitting unit, a processor configured to communicate with the image pickup apparatus and control the light emitting unit, and a memory storing a first light emission amount of the light emitting unit. The processor has a first mode for causing the light emitting unit to emit light with the first light emission amount stored in the memory, and a second mode for causing the light emitting unit to emit the light with a second light emission amount acquired from the image pickup apparatus through communication. In a case where the processor receives a light emitting instruction in the second mode from the image pickup apparatus while the light emitting unit is emitting the light in the first mode, the processor causes the light emitting unit to emit the light with the second light emission amount in the second mode. In a case where the processor receives an end instruction in the second mode from the image pickup apparatus after the processor receives the light emitting instruction in the second mode from the image pickup apparatus while the light emitting unit is emitting the light in the first mode, the processor causes the light emitting unit to emit the light with the second light emission amount in the second mode and then the light emitting unit to emit the light with the first light emission amount in the first mode. An imaging system having the above light emitting apparatus and a control method of the above light emitting apparatus also constitute another aspect of the embodiment. A storage medium storing a program that causes a computer to execute the above control method also constitutes another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
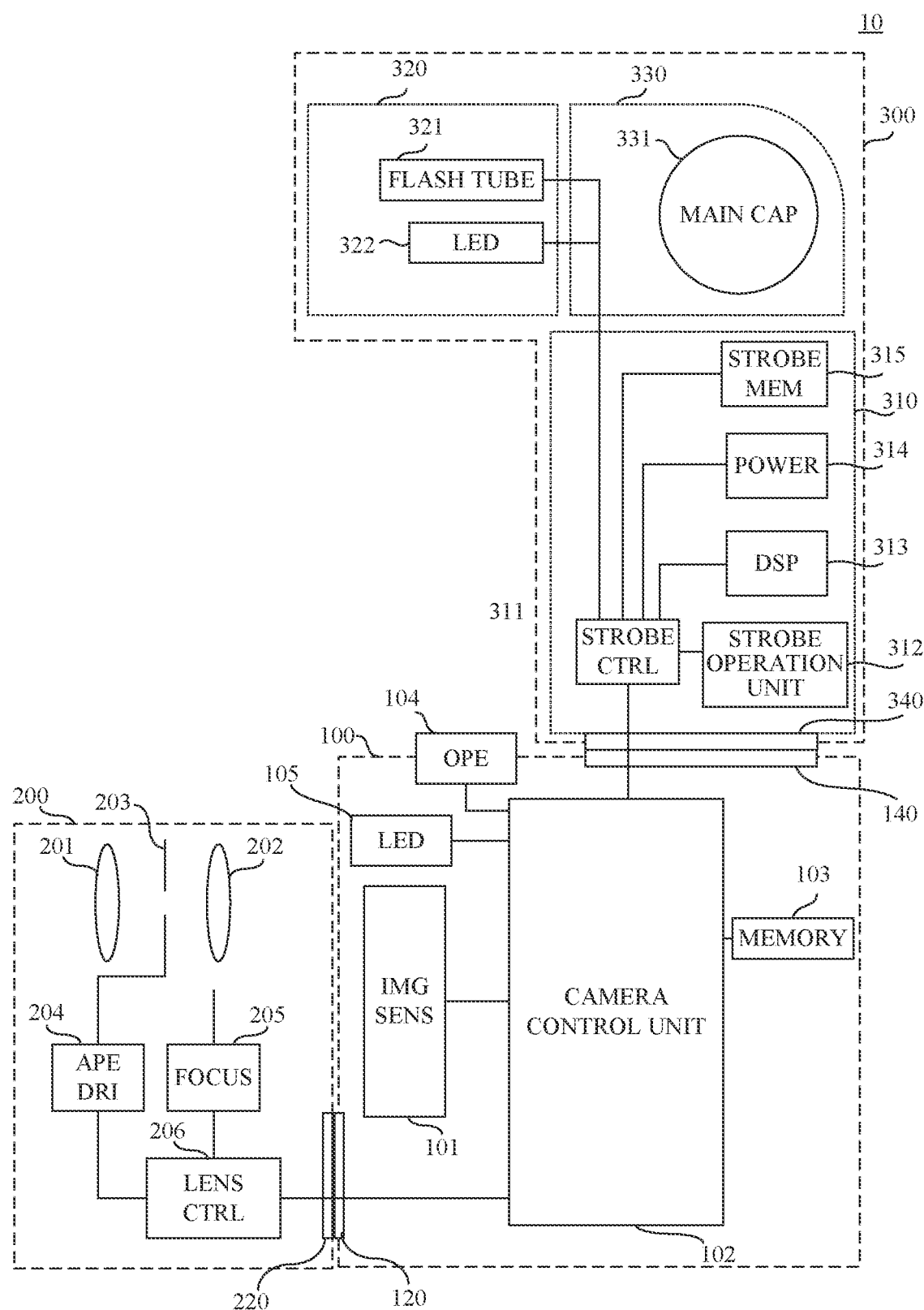
FIG. 1 is a block diagram of an imaging system according to this embodiment.

Referring now to FIG. 1, a description will be given of an imaging system (camera system) 10 according to this embodiment. FIG. 1 is a block diagram of the imaging system 10 and illustrates a hardware configuration of the imaging system 10. The imaging system 10 includes an image pickup apparatus (camera body) 100, a lens apparatus (interchangeable lens) 200 attachable to and detachable from the image pickup apparatus 100, and a light emitting apparatus (strobe) 300 attachable to and detachable from the image pickup apparatus 100. However, in this embodiment, the configuration of the imaging system 10 is not limited to this example as long as the light emitting apparatus 300 can be connected to the image pickup apparatus 100. This embodiment is applicable to an imaging system in which an image pickup apparatus and a lens apparatus are integrated, instead of the image pickup apparatus 100 and the lens apparatus 200, for example.

The image pickup apparatus 100 includes an image sensor 101, a camera control unit 102, a memory 103, an operation unit 104, an LED 105, a camera mount unit 120, and a camera-side ACC connector 140. The image sensor 101 is a photoelectric conversion element such as a CCD sensor or a CMOS sensor, and converts an optical image (object image) formed by an optical system (imaging optical system) in the lens apparatus 200 into an electrical signal to generate image data, and outputs it to the camera control unit 102.

The camera control unit 102 reads a control program for each unit of the image pickup apparatus 100 from a ROM in the memory 103, loads it in a RAM in the memory 103, and executes it. Thereby, the camera control unit 102 can control the operation of each unit of the image pickup apparatus 100 and control the image pickup apparatus 100 and the lens apparatus 200 in an integrated manner. The image sensor 101, the memory 103, the operation unit 104, the LED 105, the camera mount unit 120, the camera-side ACC connector 140, and the like are connected to the camera control unit 102. The camera control unit 102 outputs the image data output from the image sensor 101 to the RAM in the memory 103. The camera control unit 102 is connected to a focusing unit 205 and an aperture driving unit 204 of the lens apparatus 200, which will be described below, via the camera mount unit 120, a lens mount unit 220 of the lens apparatus 200 and the lens control unit 206, which will be described below.

The operation unit 104 includes a release button, which is connected to a switch SW1 (not shown) that outputs a turning-on signal by a first stroke (half pressing), and a switch SW2 (not shown) that outputs a turning-on signal by a second stroke (full pressing). The turning-on signals output from the switches SW1 and SW2 are input to the camera control unit 102. In a case where the turning-on signal is output from the switch SW1, the camera control unit 102 starts auto-exposure (AE) operation and autofocus (AF) operation of the image pickup apparatus 100. In a case where turning-on signal is output from the switch SW2, the camera control unit 102 starts imaging operation.

The LED 105 is a light emitting unit built into the image pickup apparatus 100. The LED 105 emits light as AF auxiliary light, and notifies an imaging timing by blinking as a self-timer lamp during self-timer imaging. The camera-side ACC connector 140 is connected to a strobe-side ACC connector 340 of the light emitting apparatus 300, which will be described below, and transmits an instruction signal from the camera control unit 102 to a strobe control unit (control unit) 311. Thereby, the strobe control unit 311 that has received the instruction signal controls flashlight emission by a flash tube (flashlight emitting unit) 321 described below and light emission by an LED (light emitting unit) 322 described below.

The lens apparatus 200 includes the optical system (imaging optical system) including a zoom lens 201, a focus lens 202, an aperture stop (diaphragm) 203, etc., the aperture driving unit 204, the focusing unit 205, the lens control unit 206, and the lens mount unit 220. The optical system in the lens apparatus 200 guides a light beam from an object to the image sensor 101 and forms an object image on the imaging surface of the image sensor 101 while the lens apparatus 200 is attached to the image pickup apparatus 100. Driving of the aperture driving unit 204 and focusing unit 205 is controlled according to commands from the lens control unit 206 that has received a command signal from camera control unit 102 via an unillustrated mount contact unit provided in the camera mount unit 120 and lens mount unit 220.

A description will now be given of the light emitting apparatus 300. The light emitting apparatus 300 is roughly divided into three parts: a strobe body unit 310, a strobe head unit 320 and a bounce mechanism unit 330. The strobe body unit 310 includes a strobe control unit 311, a strobe operation unit 312 including a power switch, a display unit 313, a power source 314, a strobe memory (memory) 315, and the strobe-side ACC connector 340.

The strobe control unit 311 is mounted on an unillustrated main substrate and controls the light emitting apparatus 300 as a whole. The strobe control unit 311 communicates with the camera control unit 102 via the strobe-side ACC connector 340 and the camera-side ACC connector 140. The strobe control unit 311 receives an instruction from the camera control unit 102 through communication or an instruction from the strobe operation unit 312, and controls light emission of the flashlight emitting tube 321 or the LED 322 in the strobe head unit 320, which will be described below. The strobe memory 315 stores information for various controls such as light emission. The strobe control unit 311 reads information from the strobe memory 315 and controls each unit in a variety of operations. The bounce mechanism unit 330 has an unillustrated irradiating direction variable mechanism, which is a known method for an external strobe such as the light emitting apparatus 300, a main capacitor 331, and the like.

The irradiating direction variable mechanism holds the strobe head unit 320 relative to the strobe body unit 310 rotatably in each of the horizontal direction and the vertical direction. Thereby, bounce imaging is performed in which the irradiation direction of light emitted from the flashlight emitting tube 321 is changed. The main capacitor 331 boosts the voltage of the power source 314 to several hundred volts by an unillustrated booster circuit to charge (accumulate) electrical energy in the main capacitor 331. An unillustrated resistor that detects the voltage of the main capacitor 331 is incorporated in a part of the booster circuit.

The strobe head unit 320 includes a flashlight emitting tube 321 and an LED (light emitting unit) 322 necessary for strobe light emission. The flashlight emitting tube 321 is a xenon tube or the like, and converts the electrical energy charged in the main capacitor 331 into light energy to emit flashlight according to a light emission signal from the strobe control unit 311. A reflector and a Fresnel lens (not shown) are arranged around the flashlight emitting tube 321 to adjust the light distribution.

The LED 322 is turned on as a modeling lamp or AF auxiliary light in accordance with a light emission control signal from the strobe control unit 311 for the purpose of assisting the image pickup apparatus 100 in imaging. An unillustrated lens is disposed in front of the LED 322 to adjust the light distribution of the LED 322. The LED 322 in this embodiment uses a color temperature anywhere in the range of 3000 to 6500K, for example. The light emission amount of the LED 322 is controlled by PWM control, for example. A table of the light emission amount and the duty ratio of the PWM control is recorded in an unillustrated nonvolatile memory such as an EEPROM inside the strobe control unit 311. In a case where the LED 322 is turned on as the modeling lamp, the user performs the turning-on operation to check how the light is emitted from the light emitting apparatus 300 and how the shadow appears. This operation is performed using the strobe operation unit 312. In addition, the image pickup apparatus 100 issues a modeling lamp turn-on command according to the operation of the operation unit 104 in the image pickup apparatus 100. The strobe control unit 311 may perform lighting control based on this notification.

Figure 2:
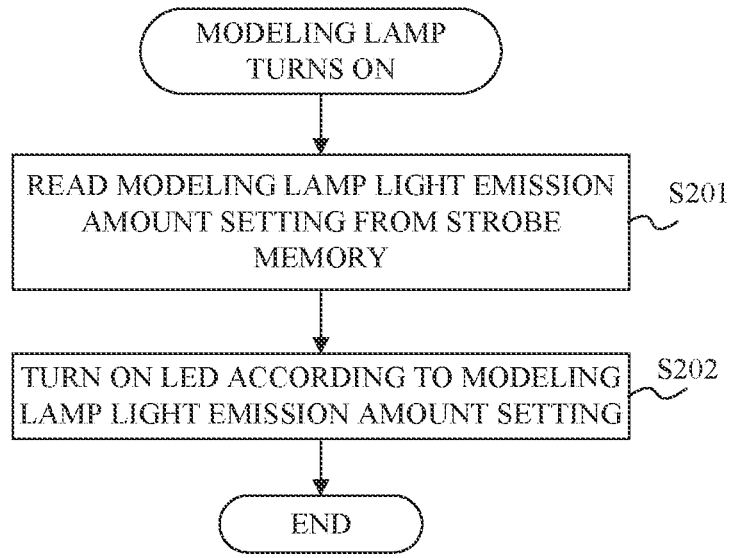
FIG. 2 is a flowchart illustrating processing for turning on a modeling lamp according to this embodiment.

Referring now to FIG. 2, a description will be given of the processing in a case where the user operates the strobe operation unit 312 and the operation unit 104 to turn on the modeling lamp. FIG. 2 is a flowchart illustrating processing for turning on the modeling lamp. Each step in FIG. 2 is mainly executed by the strobe control unit 311.

First, in step S201, the strobe control unit 311 reads the modeling lamp light emission amount setting (information about the first light emission amount) from the strobe memory 315. The modeling lamp emission amount setting can be set by the user by operating the strobe operation unit 312 or the operation unit 104, and is stored in the strobe memory 315 for each setting operation. In this embodiment, the strobe control unit 311 reads out the preset modeling lamp light emission amount setting and performs a turning-on control of the LED 322. The user may set the modeling lamp emission amount variable while the LED 322 is turned on. Even in this case, the modeling lamp emission amount setting is stored in the strobe memory 315 for each setting operation.

Next, in step S202, the strobe control unit 311 performs the turning-on control of the LED 322 so that the light emission amount of the LED 322 becomes the setting (first light emission amount) read from the strobe memory 315. Even in a case where the LED 322 is turned off, the strobe control unit 311 performs the turning-off control in accordance with the operation of the strobe operation unit 312 or the operation unit 104. A user can set the light emission amount of the modeling lamp. The light emission amount may be set based on the user's operation of the strobe operation unit 312 or the operation unit 104, and is stored in the strobe memory 315 based on the operation.

Figure 3:
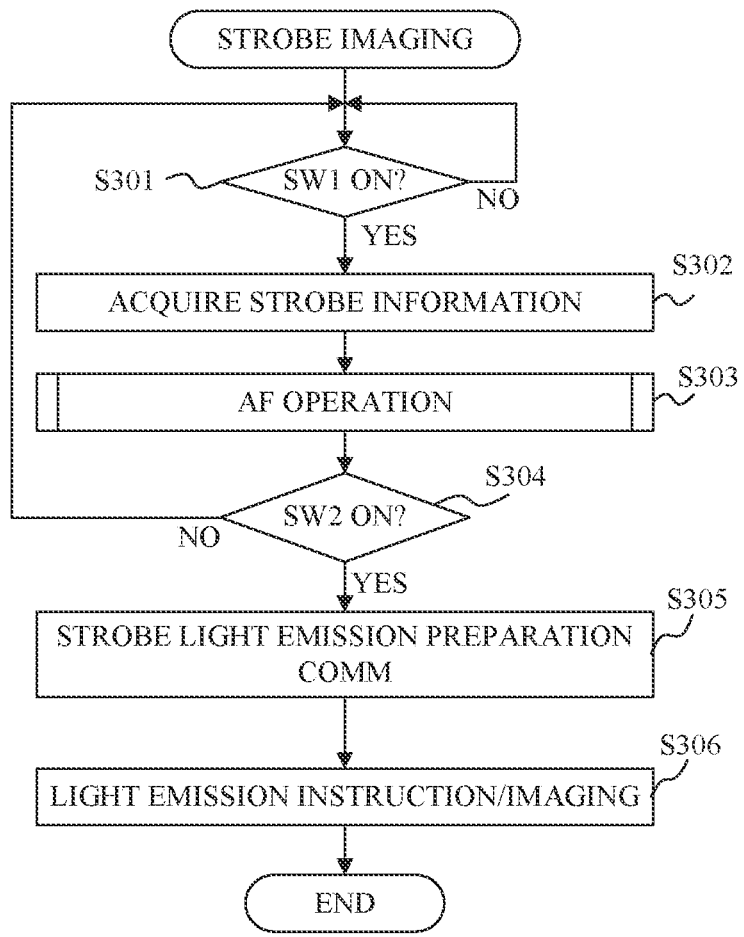
FIG. 3 is a flowchart illustrating processing of strobe imaging according to this embodiment.

Referring now to FIG. 3, a description will be given of the operation (stroboscopic imaging) of the imaging system 10 including the light emitting apparatus 300. FIG. 3 is a flowchart illustrating strobe imaging processing using the image pickup apparatus 100 and the light emitting apparatus 300. Each step in FIG. 3 is mainly executed by the camera control unit 102.

First, in step S301, the camera control unit 102 determines whether a turning-on signal has been output from the switch SW1. In a case where the camera control unit 102 determines that the turning-on signal is not output from the switch SW1, it repeats step S301. On the other hand, in a case where the camera control unit 102 determines that the turning-on signal has been output from the switch SW1, the flow proceeds to step S302. In step S302, the camera control unit 102 acquires strobe information from the light emitting apparatus 300. The strobe information includes, but is not limited to, the setting information about the light emitting apparatus 300, the LED mounting information, and the information about the charging state of the main capacitor. Next, in step S203, the camera control unit 102 executes the AF operation.

Figure 4:
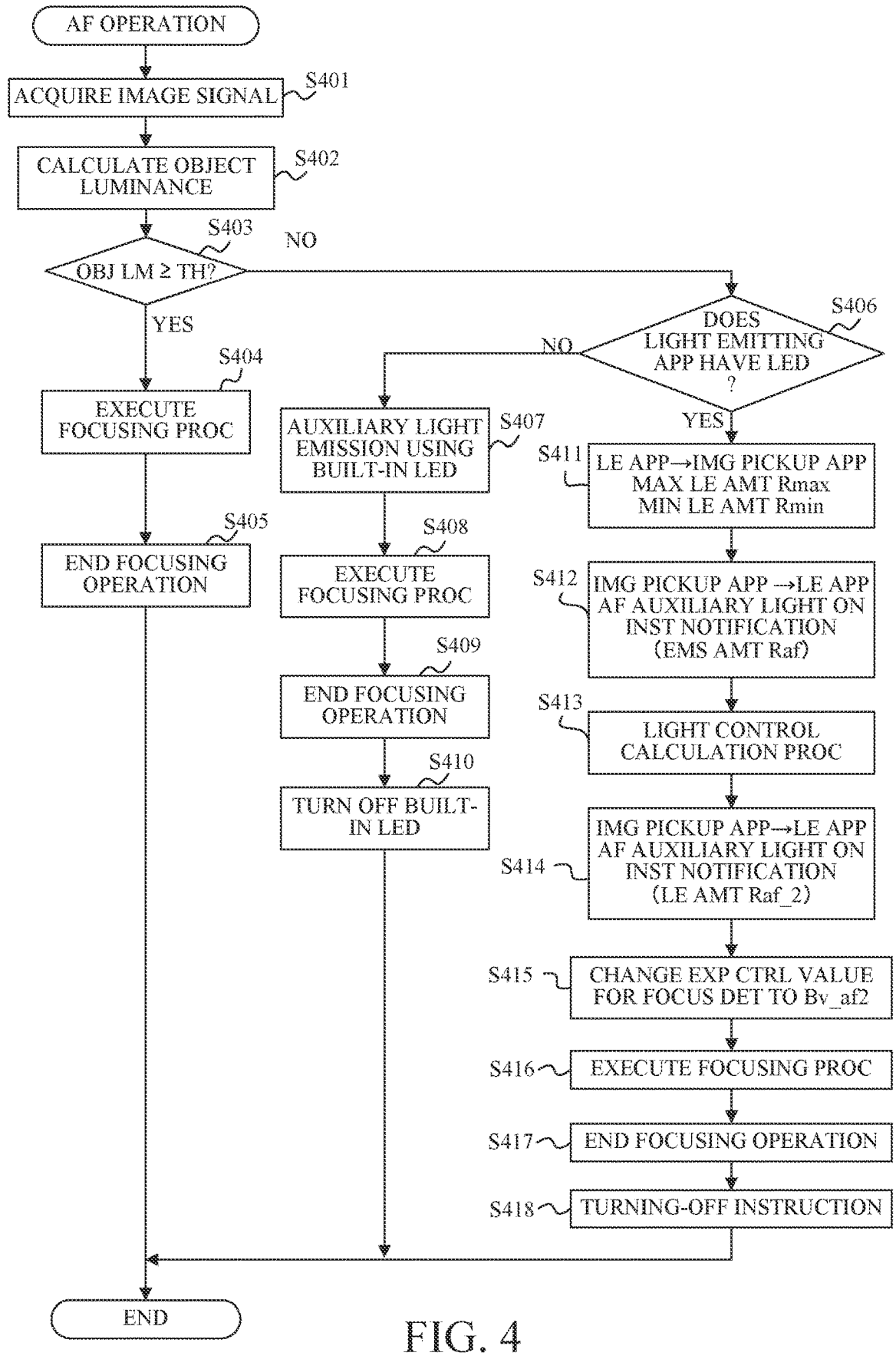
FIG. 4 is a flowchart illustrating an AF operation according to this embodiment.

Referring now to FIG. 4, a description will be given of the AF operation. FIG. 4 is a flowchart illustrating the AF operation. Each step in FIG. 4 is mainly executed by the camera control unit 102.

First, in step S401, the camera control unit 102 acquires image data (image signal) necessary for the AF operation from the memory 103. Next, in step S402, the camera control unit 102 calculates object luminance from the image data. Next, in step S403, the camera control unit 102 determines whether or not the object luminance obtained in step S402 is equal to or higher than a threshold. In a case where the camera control unit 102 determines that the object luminance is equal to or higher than the threshold, the flow proceeds to step S404. On the other hand, in a case where the camera control unit 102 determines that the object luminance is lower than the threshold, the flow proceeds to step S406.

In step S404, the camera control unit 102 performs AF calculation (focusing processing) based on the image data. More specifically, the camera control unit 102 calculates a defocus distance (defocus amount) to the object, contrast, reliability, and the like. Thereafter, the camera control unit 102 instructs the lens control unit 206 based on these calculation results to drive the focusing unit 205 to move the focus lens 202 to an in-focus position. In a case where the defocus amount cannot be calculated, the camera control unit 102 performs search driving for the focus lens 202 and drives the focus lens 202 to a position where the defocus amount can be calculated.

Next, in step S405, in a case where the camera control unit 102 determines that the focus lens 202 has moved to the in-focus position, it ends the focusing operation. In a case where the camera control unit 102 cannot calculate the defocus amount even if the entire focus area is moved by search driving in step S404, the camera control unit 102 determines that the in-focus state is unavailable and ends the focusing operation.

In step S406, the camera control unit 102 determines whether or not the light emitting apparatus 300 has an LED that can be used as AF auxiliary light, based on the strobe information obtained in step S302 of FIG. 3. In a case where the camera control unit 102 determines that the light emitting apparatus 300 has no LED, the flow proceeds to step S407. On the other hand, in a case where the camera control unit 102 determines that the light emitting apparatus 300 has the LED, the flow proceeds to step S411.

In step S407, the camera control unit 102 turns on (emits) the built-in LED (LED 105) of the image pickup apparatus 100 with a fixed light amount as AF auxiliary light. Next, in step S408, the camera control unit 102 performs focusing processing while the LED 105 is turned on with the fixed light amount as the AF auxiliary light. Next, in step S409, the camera control unit 102 ends the focusing operation after the focus lens 202 moves to the in-focus position. In a case where the camera control unit 102 cannot calculate the defocus amount even if the entire focus area is moved by search driving in step S408, the camera control unit 102 determines that the in-focus state is unavailable and ends the focusing operation. Next, in step S410, the camera control unit 102 turns off the LED 105, and ends this processing.

Next follows a description of processing for causing the LED 322 of the light emitting apparatus 300 to emit light as AF auxiliary light in steps S411 to S417. First, in step S411, the camera control unit 102 communicates with the strobe control unit 311 of the light emitting apparatus 300 to receive a maximum light emission amount Rmax and a minimum light emission amount Rmin of the LED 322. Here, the maximum light emission amount Rmax and the minimum light emission amount Rmin are stored in the ROM of the strobe memory 315, for example.

Next, in step S412, the camera control unit 102 notifies the strobe control unit 311 of an AF auxiliary light turning-on instruction at the AF auxiliary light emission amount Raf. At the same time, the camera control unit 102 notifies the strobe control unit 311 of information indicating that this turning-on instruction is turning-on as the AF auxiliary light. The light emission amount Raf is determined according to the light condensing ability of the lens apparatus 200, that is, the aperture stop 203 during AF processing. The setting of the aperture stop 203 during AF processing is set to the fully open F-value of the lens apparatus 200, unlike during imaging processing. This is because high AF performance, that is, an in-focus distance and responsiveness can be maintained by taking in a larger light amount during AF processing. In a case where the light emission amount Raf is outside the range between the maximum light emission amount Rmax and the minimum light emission amount Rmin, the value of the light emission amount Raf is changed so that it falls within the range between the maximum light emission amount Rmax and the minimum light emission amount Rmin.

Next, in step S413, the camera control unit 102 performs light control calculation processing. The light emission amount Raf is not necessarily the optimum light emission amount depending on conditions such as the object distance and the contrast. Therefore, the camera control unit 102 calculates the light emission amount of the LED 322 and the exposure control value (shutter speed, ISO speed) for focus detection by light adjustment calculation processing.

Next, in step S414, the camera control unit 102 notifies the strobe control unit 311 of an AF auxiliary light turning-on instruction with the AF auxiliary light emission amount Raf_2 of the AF auxiliary light, and changes the light emission amount. At the same time, the camera control unit 102 notifies information indicating that this turning-on instruction is turning-on of the AF auxiliary light. This processing can be omitted in a case where the light emission amount Raf_2 is equal to the light emission amount Raf1. The strobe control unit 311 that has received the AF auxiliary light turning-on instruction continuously turns on the LED 322 until it receives the turning-off instruction.

Next, in step S415, the camera control unit 102 changes the exposure control value for focus detection calculated in step S413 to Bv_af2. In a case where the light emission amount changes due to the light control, the exposure control value (shutter speed, ISO speed) must be used to properly expose the object. Therefore, the exposure control value must be changed in accordance with the light control. This processing can be omitted if there is no change in the exposure control value. Next, in steps S416 and S417, the camera control unit 102 performs processing similar to steps S404 and S405, respectively. Next, in step S418, the camera control unit 102 notifies the strobe control unit 311 of a turning-off instruction, and ends this processing.

Figure 5:
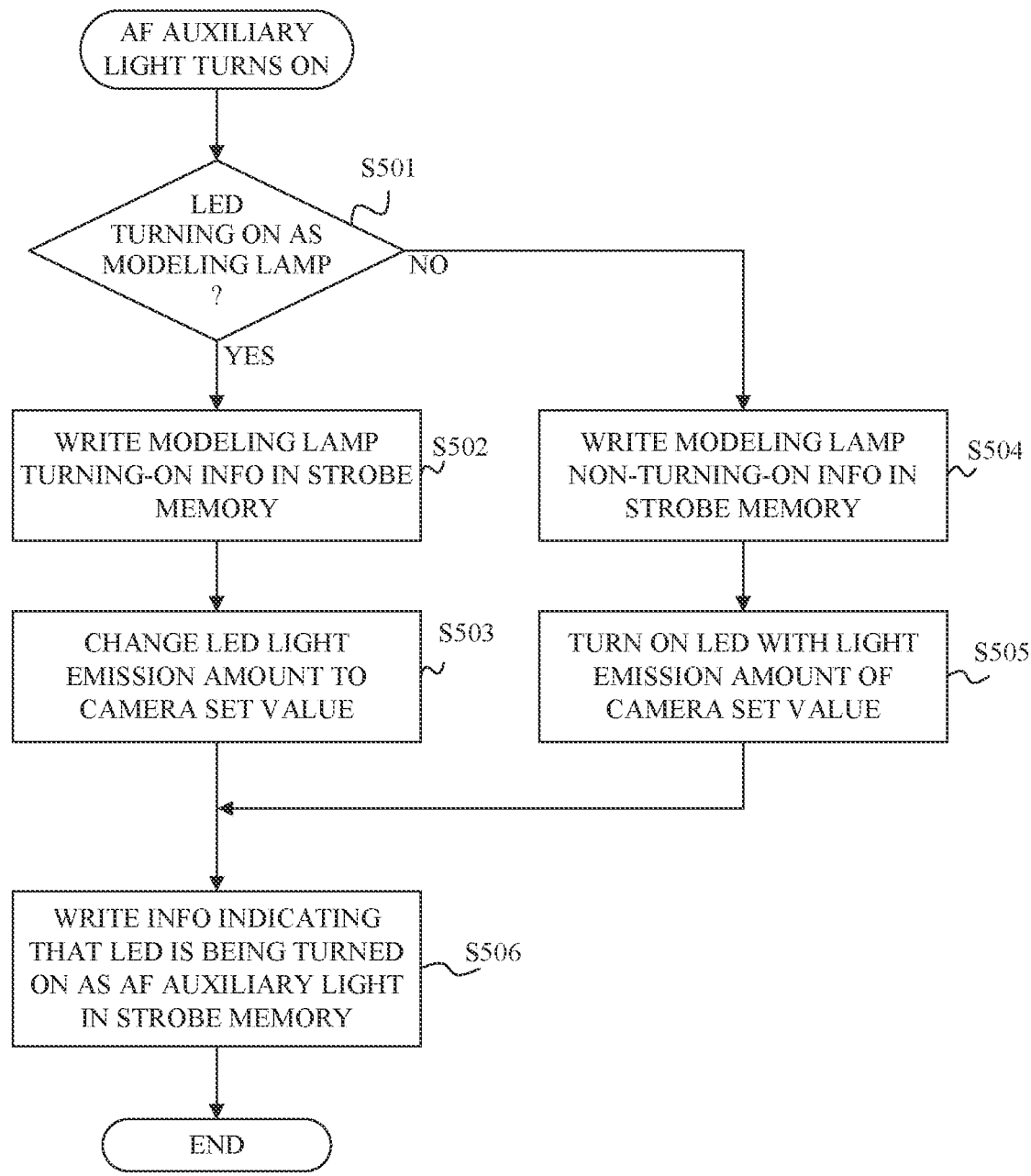
FIG. 5 is a flowchart illustrating processing for turning on AF auxiliary light according to this embodiment.

Referring now to FIG. 5, a description will be given of processing (light lighting processing) of the strobe control unit 311 (AF auxiliary light turning-on processing) in a case where the strobe control unit 311 is notified of the AF auxiliary light turning-on instruction from the camera control unit 102 in steps S412 and S414 of FIG. 4. FIG. 5 is a flowchart illustrating AF auxiliary light turning-on processing. Each step in FIG. 5 is mainly executed by the strobe control unit 311.

First, in step S501, the strobe control unit 311 determines whether the LED 322 is being turned on as a modeling lamp. In a case where the strobe control unit 311 determines that the LED 322 is being turned on as the modeling lamp, the flow proceeds to step S502. In step S502, the strobe control unit 311 causes the strobe memory 315 to store modeling lamp turning-on information about the LED 322 (information indicating that the LED 322 is being turned on as a modeling lamp). Next, in step S503, the strobe control unit 311 controls the LED 322 so as to change the light emission amount of the LED 322 to a light emission amount (second light emission amount) notified (acquired) from the camera control unit 102. Next, in step S506, the strobe control unit 311 causes the strobe memory 315 to store the information indicating that the LED 322 is turning on the AF auxiliary light, and ends this processing.

On the other hand, in a case where the strobe control unit 311 determines in step S501 that the LED 322 is not being turned on as a modeling lamp, the flow proceeds to step S504. In step S504, the strobe control unit 311 causes the strobe memory 315 to store information indicating that the LED 322 is not being turned on as the modeling lamp (modeling lamp non-turning-on information). Next, in step S505, the strobe control unit 311 controls turning-on of the LED 322 so that the light emission amount of the LED 322 becomes the light emission amount (second light emission amount) notified (acquired) from the camera control unit 102. Next, in step S506, the strobe control unit 311 causes the strobe memory 315 to store information indicating that the LED 322 is turning on the AF auxiliary light, and ends this processing.

Figure 6:
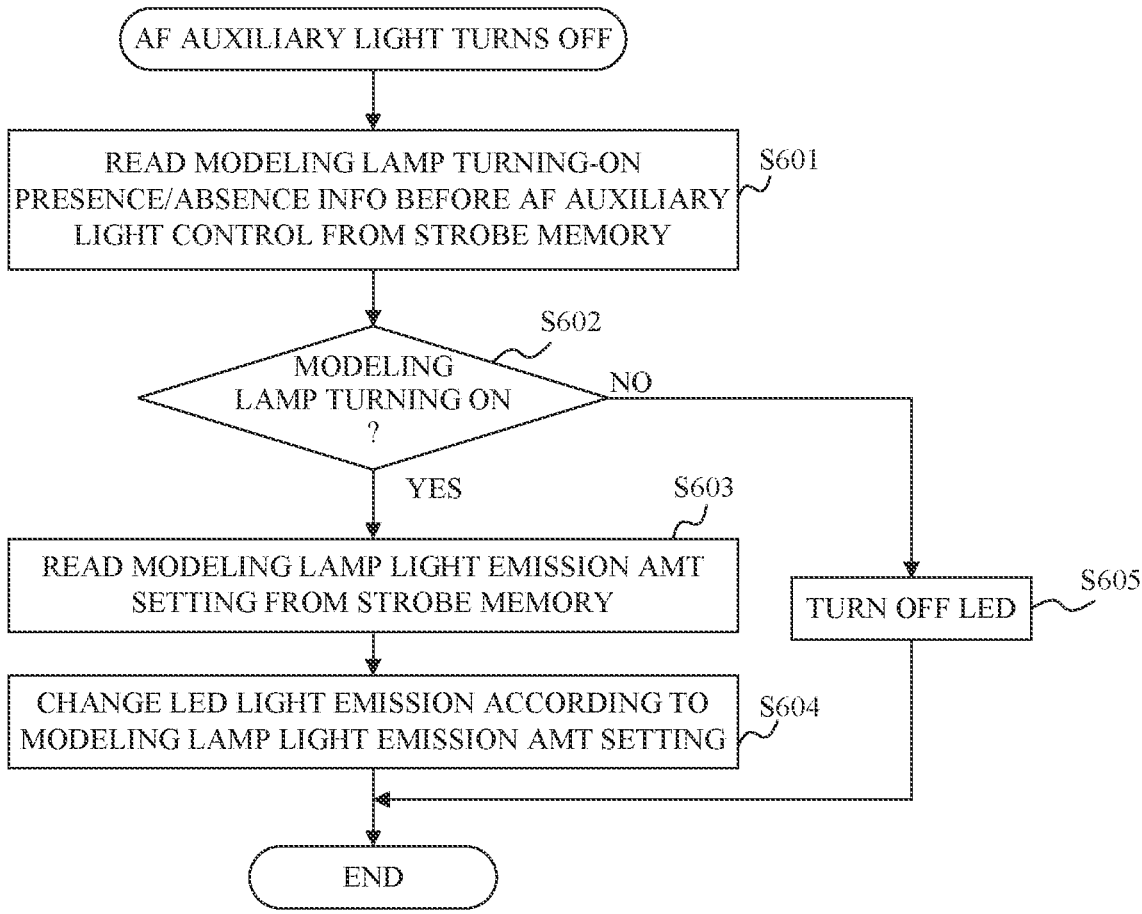
FIG. 6 is a flowchart illustrating processing for turning off the AF auxiliary light according to this embodiment.

Referring now to FIG. 6, a description will be given of processing of the strobe control unit 311 in a case where the strobe control unit 311 receives an AF auxiliary light turning-off instruction from the camera control unit 102 in step S418 of FIG. 4. FIG. 6 is a flowchart illustrating AF auxiliary light turning-off processing. Each step in FIG. 6 is mainly executed by the strobe control unit 311.

First, in step S601, before executing control of the AF auxiliary light, the strobe control unit 311 reads from the strobe memory 315 modeling lamp turning-on presence/absence information indicating whether the LED 322 has turned on the modeling lamp. Next, in step S602, the strobe control unit 311 determines whether or not the LED 322 was turning on the modeling lamp based on the modeling lamp turning-on presence/absence information. In a case where the strobe control unit 311 determines that the LED 322 was turning on the modeling lamp, the flow proceeds to step S603. In step S603, the strobe control unit 311 reads out the modeling lamp emission amount setting from the strobe memory 315. Next, in step S604, the strobe control unit 311 changes the light emission amount of the LED 322 so that the light emission amount of the LED 322 matches the modeling lamp light emission amount setting read from the strobe memory 315.

On the other hand, in a case where the strobe control unit 311 determines in step S602 that the LED 322 was not turning on the modeling lamp, the flow proceeds to step S605. In step S605, the strobe control unit 311 turns off the LED 322.

After the AF operation is completed in step S303 of FIG. 3 through the above processing, the flow proceeds to step S304. In step S304, the camera control unit 102 determines whether a turning-on signal has been output from the switch SW2. In a case where the camera control unit 102 determines that the turning-on signal is not output from the switch SW2, the flow returns to step S301, and the flow repeats steps S301 to S304 until the switch SW2 is turned on. On the other hand, in a case where the camera control unit 102 determines that the turning-on signal has been output from the switch SW2, the flow proceeds to step S305. In step S305, the camera control unit 102 communicates with the light emitting apparatus 300 for strobe light emission during imaging (strobe light emission preparation communication).

Figure 7:
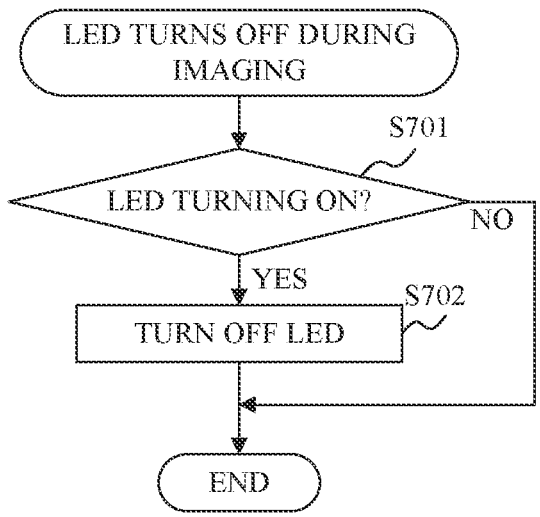
FIG. 7 is a flowchart illustrating processing for turning off the LED during imaging according to this embodiment.

Referring now to FIG. 7, a description will be given of control of the LED 322 by the strobe control unit 311 (LED turning-off processing during imaging) in a case where the camera control unit 102 and the strobe control unit 311 communicate with each other for strobe light emission during imaging in step S305. FIG. 7 is a flowchart illustrating the LED turning-off processing during imaging. Each step in FIG. 7 is mainly executed by the strobe control unit 311.

First, in step S701, the strobe control unit 311 determines whether the LED 322 is turned on. In a case where the strobe control unit 311 determines that the LED 322 is turned on, the flow proceeds to step S702. In step S702, the strobe control unit 311 turns off the LED 322. On the other hand, in a case where it is determined in step S701 that the LED 322 is not turned on, the flow ends.

In a case where the strobe light emission communication during imaging in step S305 of FIG. 3 is completed, the flow proceeds to step S306. In step S306, the camera control unit 102 notifies the light emitting apparatus 300 of a flashlight emitting instruction, and performs imaging processing (exposure processing) in synchronization with the light emission. At this time, as described with reference to FIG. 7, the LED 322 mounted on the light emitting apparatus 300 is turned off. Therefore, the light emitted from the LED 322 does not affect the captured image.

The strobe control unit 311 does not turn on the LED 322 even if it detects that the processing of step S306 has ended by communication from the camera control unit 102 or the like. Thereby, power consumption can be reduced in a case where the LED 322 is automatically turned on after imaging. In a case where the user determines that it is necessary to turn on the LED 322, the LED 322 can be turned on by the user's operation.

In a case where the light emitting apparatus 300 performs AF auxiliary light control while the modeling lamp of the LED 322 is turned on, this embodiment does not turn off the LED 322 even if an AF auxiliary light turning-off notification from the image pickup apparatus 100 is received, and the light emission amount is returned to the modeling lamp emission amount stored in the strobe memory 315. Thereby, the lighting effect of the light emitting apparatus 300 can be early confirmed even in the in-focus state after the AF control. By turning off the LED 322 in the flashlight emission communication for imaging is received, this embodiment can prevent the light emission of the LED 322 from affecting the captured image. After the AF auxiliary light control while the modeling lamp of the LED 322 is turned on, this embodiment returns the light emission amount to the modeling lamp light emission amount and continues light emission, but whether the modeling lamp after the AF auxiliary light control is to continuously be turned on or turned off may be selected by the user's setting operation.

In a case where AF auxiliary light control is performed while the modeling lamp is turned on and the AF auxiliary light turning-off notification is received, this embodiment can return the modeling lamp light emission amount to that stored in the strobe memory 315 without turning off the LED 322, but the LED 322 may be turned off once. That is, as long as the light emission amount of the LED 322 is automatically returned to the modeling lamp emission amount after the AF auxiliary light control while the modeling lamp of the LED 322 is turned on, the LED 322 may be continuously turned on or may not be continuously turned on during transition from the AF auxiliary light to the modeling lamp. In a case where the LED 322 is once turned off, the user or object can confirm the lighting effect of the light emitting apparatus 300 even in the in-focus state after the AF control, and easily recognize that the focusing operation ends because the LED 322 is turned off when the AF auxiliary light is turned off. However, the function as a modeling lamp may be resumed as soon as possible, even if the LED 322 is once turned off to notify that the focusing operation has ended, the turning-off period may be less than 1 second.

In this embodiment, the light emitting apparatus 300 has the flashlight emitting tube 321, but the light emitting apparatus may be a light emitting apparatus that does not have a flashlight emitting unit.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This embodiment can provide a light emitting apparatus that can properly control light emission.

This application claims the benefit of Japanese Patent Application No. 2022-168414, filed on Oct. 20, 2022, which is hereby incorporated by reference herein in its entirety.

What is claimed is:

1. A light emitting apparatus attachable to and detachable from an image pickup apparatus, the light emitting apparatus comprising:
   a light emitting unit;
   a processor configured to communicate with the image pickup apparatus and control the light emitting unit; and a memory storing a first light emission amount of the light emitting unit, wherein the processor has a first mode for causing the light emitting unit to emit light with the first light emission amount stored in the memory, and a second mode for causing the light emitting unit to emit the light with a second light emission amount acquired from the image pickup apparatus through communication, wherein in a case where the processor receives a light emitting instruction in the second mode from the image pickup apparatus while the light emitting unit is emitting the light in the first mode, the processor causes the light emitting unit to emit the light with the second light emission amount in the second mode, wherein in a case where the processor receives an end instruction in the second mode from the image pickup apparatus after the processor receives the light emitting instruction in the second mode from the image pickup apparatus while the light emitting unit is emitting the light in the first mode, the processor causes the light emitting unit to emit the light with the second light emission amount in the second mode and then the light emitting unit to emit the light with the first light emission amount in the first mode, wherein in a case where the processor receives the light emitting instruction in the second mode from the image pickup apparatus while the light emitting unit does not emit the light in the first mode, the processor causes the light emitting unit to emit the light with the second light emission amount in the second mode, and wherein in a case where the processor receives the end instruction of the second mode from the image pickup apparatus after the processor receives the light emitting instruction in the second mode from the image pickup apparatus while the light emitting unit does not emit the light in the first mode, the processor causes the light emitting unit to stop emitting the light.

2. The light emitting apparatus according to claim 1, wherein the light emitting unit includes an LED.

3. The light emitting apparatus according to claim 1, wherein the processor is configured to change a light amount emitted from the light emitting unit without stopping emitting the light of the light emitting unit, in transitioning from the first mode to the second mode, or in transitioning from the second mode to the first mode.

4. The light emitting apparatus according to claim 1, further comprising a flashlight emitting unit, wherein the processor is configured to cause the light emitting unit to stop emitting the light in a case where the processor receives a light emitting instruction of the flashlight emitting unit from the image pickup apparatus while the light emitting unit is emitting the light in the first mode.

5. The light emitting apparatus according to claim 4, wherein the processor maintains a light emission stopping state of the light emitting unit in a case where the processor receives the light emitting instruction of the flashlight emitting unit from the image pickup apparatus and causes the light emitting unit to stop emitting the light.

6. The light emitting apparatus according to claim 1, wherein the first mode is a mode for using the light emitting unit as a modeling lamp.

7. The light emitting apparatus according to claim 1, wherein the second mode is a mode for using the light emitting unit as AF auxiliary light.

8. An imaging system comprising:

the light emitting apparatus according to claim 1; and an image pickup apparatus.

9. A control method of a light emitting apparatus attachable to and detachable from an image pickup apparatus, the control method comprising the steps of:

in a case where while a light emitting unit is emitting light in a first mode, a light emitting instruction in a second mode is received from the image pickup apparatus, causing the light emitting unit to emit the light with a second light emission amount in the second mode, in a case where an end instruction of the second mode is received from the image pickup apparatus after the light emitting instruction in the second mode is received from the image pickup apparatus while the light emitting unit is emitting the light in the first mode, causing the light emitting unit to emit the light with the second light emission amount in the second mode and then the light emitting unit to emit the light with a first light emission amount in the first mode, in a case where while the light emitting unit does not emit the light in the first mode, the light emitting instruction in the second mode is received from the image pickup apparatus, causing the light emitting unit to emit the light with the second light emission amount in the second mode, and in a case where the end instruction of the second mode is received from the image pickup apparatus after the light emitting instruction in the second mode is received from the image pickup apparatus while the light emitting unit does not emit the light in the first mode, the light emitting instruction in the second mode is received from the image pickup apparatus, causing the light emitting unit to stop emitting the light, wherein the first mode is a mode for causing the light emitting unit to emit the light with the first light emission amount stored in a memory, and the second mode is a mode for causing the light emitting unit to emit the light with the second light emission amount acquired from the image pickup apparatus through communication.

10. A non-transitory computer-readable storage medium storing a program that causes a computer to execute the control method according to claim 9.

* * * * *